Figure 1:
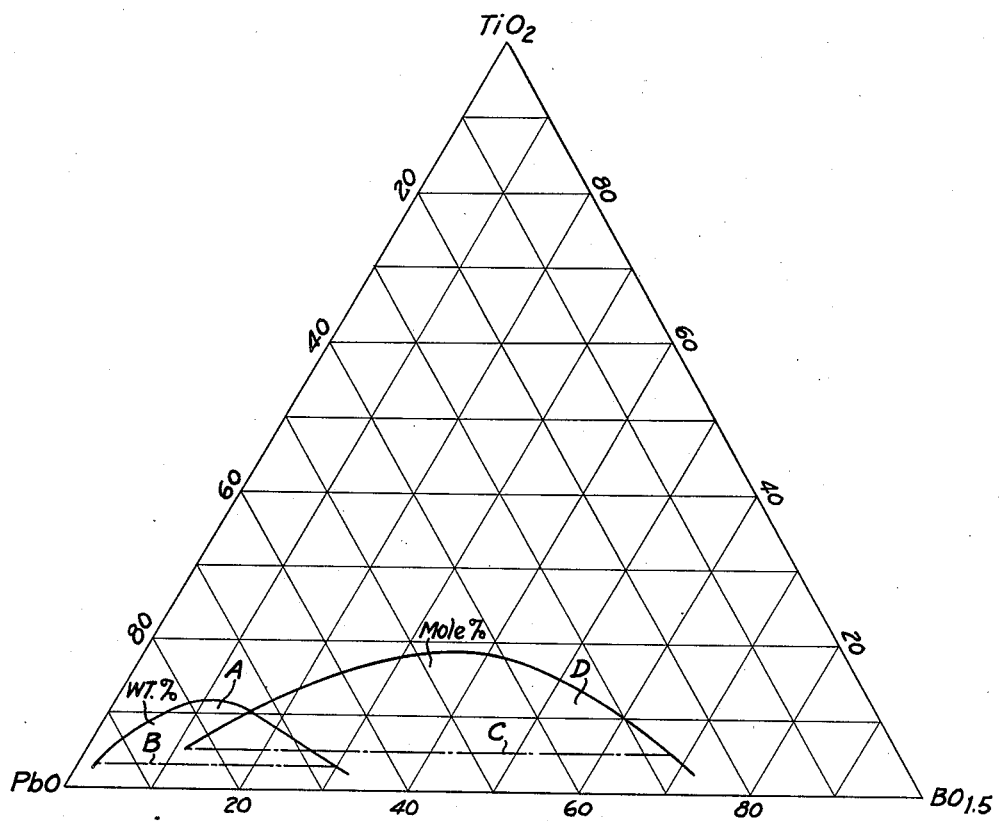

Patented June 7, 1949

2,472,447

UNITED STATES PATENT OFFICE 2,472,447

LEAD-TITANIUM-BORATE GLASS

Kuan-Han Sun, Rochester, N. Y., assignor to Eastman Kodak Company, Rochester, N. Y., a corporation of New Jersey Application January 29, 1946, Serial No. 644,181

2 Claims. (Cl. 106—47)

The present invention relates to glasses of very high refractive index and dielectric constant with high dispersion or relatively low Abbe value. It also relates to glasses containing a large amount of lead but, different from ordinary high lead glasses, durable against moisture attack.

The particular Abbe values of these glasses are due to the selection of borate types of glasses. The good weathering property is due to the substitution for lead of a considerable amount of titanium, which contributes to the high moisture resistance without sacrificing high refractive properties. These glasses are also harder than the ordinary high lead-containing glasses. They are useful as optical material, high dielectric substances, or as decorative gem stones.

The glasses are made from batches predominantly composed of the components: PbO, $TiO_2$ and $B_2O_3$ (or $BO_{1.5}$). In designating a glass batch, it is convenient from the experimental point of view to indicate in weight percentages the actual individual constituents used. However, from the theoretical point of view, the ingredients are better represented by the "cationic" percentage. Since $B_2O_3$ is an empirical formula, it is equally expedient and more convenient, particularly in using "cationic" percentage or electropositive atomic percentage, to adopt the form $BO_{1.5}$. The glass formation region in this system is shown in Figure 1. As the glass formation is a function of experimental conditions such as the size and the temperature of the melts, the molding temperature, etc., the boundary lines are arbitrary. Both the weight percentages and mole or cationic percentages are given.

However, there must be sufficient titanium present to have the desired effect, at least three per cent by weight or five mole per cent, and I have indicated these limits, respectively, by a dot-dash line B in the region A and a dot-dash line C in region D, and I consider as within my invention only those proportions indicated by the areas above those lines.

It is to be noted that the amount of titanium oxide may be from 3 to 12 weight per cent or 5 to 20 mole per cent; lead oxide from 66 to 95 weight per cent or 23 to 89 mole per cent; and boron oxide, 2 to 30 weight per cent or 10 to 68 mole per cent. It is also to be noted that small amounts of various components may be added to increase the chemical durability and to minimize devitrification. Such an addition should not be considered as a major modification from the present invention.

The following example, which is one of the best glasses in this system, gives the batch composition in weight and mole per cents and the optical properties of the resulting glass.

|  | Weight, per cent | Cationic, per cent |
|---|---|---|
| Lead Oxide (PbO) | 78 | 44.4 |
| Titanium Oxide ($TiO_2$) | 12 | 19.1 |
| Boron Oxide ($BO_{1.5}$) | 10 | 36.5 |
| $n_D$ | 2.0685 | |
| $\nu$ | 17.7 | |

These glasses can be made by using $Pb_3O_4$, PbO, $Pb(NO_3)_2$, etc. for the component PbO, $TiO_2$, as such, and $H_3BO_3$ for the component $BO_{1.5}$. The batches are mixed uniformly and placed in a high silica (96%) glass crucible. Such a glass is described in the Journal of the American Ceramic Society, October 1, 1944, pages 299-305, and is marketed under the trade-mark Vycor. For a 40-gram melt, five to seven minutes will suffice to form a fluid and uniform liquid at about 1300° C. At 1000° C. it may take about one half hour before a clear and uniform liquid is obtained. The liquid is shaken and poured to a mold previously heated to about 350° C. A clear and slightly yellow glass is usually obtained. The color increases with lead content. It is bright and should be particularly useful as gem stone. The glass with high titanium content is particularly durable against moisture attack. Because of the corrosive nature of the high lead-containing melts, the silica glass crucible is attacked somewhat, and the resulting glasses may contain some silica therefrom. Silica, however, is not harmful to the glass.

Having thus described my invention, what I claim is:

1. A borate optical glass having a refractive index greater than 2.0 and consisting of the fused heat reaction product of a batch comprising essentially titanium dioxide, 3 to 12 per cent by weight; lead oxide, 66 to 95 per cent; and boric oxide, 2 to 30 per cent.

2. Optical glass having an $n_D$ value greater than 2.0 and consisting of the fused heat reaction product of a batch consisting of titanium oxide, 12 parts by weight; lead oxide, 78 parts; and boron oxide, 10 parts.

KUAN-HAN SUN.

REFERENCES CITED

The following references are of record in the file of this patent:

UNITED STATES PATENTS

| Number | Name | Date |
|---|---|---|
| 1,943,051 | Berger | Jan. 9, 1934 |

FOREIGN PATENTS

| Number | Country | Date |
|---|---|---|
| 325,673 | Germany | 1920 |